US011155002B2

(12) United States Patent
Pans et al.

(10) Patent No.: US 11,155,002 B2
(45) Date of Patent: Oct. 26, 2021

(54) PROCESS FOR BINDING LIGNOCELLULOSIC MATERIALS USING POLYISOCYANATE COMPOSITIONS

(71) Applicant: Huntsman International LLC, The Woodlands, TX (US)

(72) Inventors: Griet Pans, Hoeleden (BE); Daniele Pratelli, Brussels (BE); Christopher Phanopoulos, Moorsel (BE)

(73) Assignee: HUNTSMAN INTERNATIONAL LLC, The Woodlands, TX (US)

(*) Notice: Subject to any disclaimer, the term of this patent is extended or adjusted under 35 U.S.C. 154(b) by 0 days.

(21) Appl. No.: 16/634,706

(22) PCT Filed: Aug. 14, 2018

(86) PCT No.: PCT/EP2018/072003
§ 371 (c)(1),
(2) Date: Jan. 28, 2020

(87) PCT Pub. No.: WO2019/042760
PCT Pub. Date: Mar. 7, 2019

(65) Prior Publication Data
US 2020/0206969 A1   Jul. 2, 2020

(30) Foreign Application Priority Data

Aug. 29, 2017 (EP) .................................. 17188270

(51) Int. Cl.
| B27N 3/00 | (2006.01) |
| B27N 3/04 | (2006.01) |
| B27N 3/08 | (2006.01) |
| C08G 18/76 | (2006.01) |
| C08L 97/02 | (2006.01) |

(52) U.S. Cl.
CPC .............. B27N 3/002 (2013.01); B27N 3/04 (2013.01); B27N 3/08 (2013.01); C08G 18/7664 (2013.01); C08L 97/02 (2013.01)

(58) Field of Classification Search
CPC .. B27N 3/00–28; C08G 18/7664; C08L 97/02
See application file for complete search history.

(56) References Cited

U.S. PATENT DOCUMENTS

| 4,898,776 | A | 2/1990 | Israel et al. |
| 7,071,248 | B2 * | 7/2006 | Chen ...................... C08G 18/36 |
| | | | 524/14 |
| 9,920,202 | B2 * | 3/2018 | Mente ....................... D21J 1/04 |

FOREIGN PATENT DOCUMENTS

| DE | 102014119242 | 6/2016 |
| EP | 2347874 | 7/2011 |
| GB | 1444933 | 8/1976 |
| GB | 1523601 | 9/1978 |
| GB | 2018796 | 10/1979 |
| WO | 200756839 | 5/2007 |
| WO | 2012072496 A1 | 6/2012 |
| WO | 201345551 | 4/2013 |
| WO | 2016022686 A1 | 2/2016 |

OTHER PUBLICATIONS

International Search Report received in corresponding PCT Application No. PCT/EP2018/072003 dated Nov. 13, 2018.
Written Opinion of the Searching Authority received in corresponding PCT Application No. PCT/EP2018/072003 dated Nov. 13, 2018.
International Publication of corresponding PCT Application No. PCT/EP2018/072003 published Mar. 7, 2019.
Wenderdel et al., Investigation of the influence of pulping parameters on morphological characteristics of TMP-pulp made from Scots pine, European Journal of Wood and Wood Products, 2012, vol. 70, p. 85-89.
Benthien et al., Investigation of the interrelations between defibration conditions, fiber size and medium-density fiberboard (MDF) properties, Eur. J. Wood Prod., 2016, DOI 10.1007/s00107-016-1094-2.
Hejda et al., Surface Free Energy Determination by Contact Angle Measurements—A Comparison of Various Approaches, WDS'10 Proceedings of Contributed Papers, Part III, 2010, p. 25-30.

* cited by examiner

*Primary Examiner* — Mary Lynn F Theisen
(74) *Attorney, Agent, or Firm* — Huntsman International LLC; Robert Diaz

(57) ABSTRACT

A process for binding lignocellulosic material comprising the steps of a) bringing lignocellulosic material into contact with a methylene bridged polyphenyl polyisocyanate composition and b) subsequently allowing said material to bind wherein said polyisocyanate composition has a surface tension below or equal to 46 mN/m.

16 Claims, 2 Drawing Sheets

Figure 1: Schematic diagram of the Wilhelmy plate method

Figure 2. Surface free energy of the wood fiber fractions

Figure 3. Work of adhesion between standard wood fiber fractions and different isocyanates

PROCESS FOR BINDING LIGNOCELLULOSIC MATERIALS USING POLYISOCYANATE COMPOSITIONS

CROSS-REFERENCE TO RELATED APPLICATIONS

This application is the National Phase of International Application PCT/EP2018/072003 filed Aug. 14, 2018 and which claims priority to EP Application No. 17188270.7 filed Aug. 29, 2017. The noted applications are incorporated herein by reference.

BACKGROUND OF THE INVENTION

Field of the Invention

This invention relates to the use of polyisocyanate compositions in binding lignocellulosic materials used in the manufacture of composite wood panels, in particular fiberboard such as high density fiberboard (HDF), medium density fiberboard (MDF) and wood fiber insulation board.

Medium density fiberboard (MDF) refers to a composite product comprising wood fibers pressed and glued together with an adhesive, typically a phenol-formaldehyde or urea-formaldehyde resin, or a polymeric diphenylmethane diisocyanate adhesive. Frequently, MDF panels also comprise a wax. MDF is commonly manufactured as flat sheets or boards of various thicknesses (typically from 3 mm to 25 mm) and densities (typically of from 650 to 800 kg/m3), and may be supplied with a visually-attractive paper- or wood-veneer or plastics surface finish or surface coating. The panels find wide end use applications, for example, in furniture, decorative interior wall lining, doors, separation walls and many other typically indoor applications.

The use of organic polyisocyanates as binders for lignocellulosic material in the manufacture of sheets or molded bodies such as wafer board, chipboard, fiberboard and plywood is well known and is commercially desirable because the resulting composites have high adhesive and cohesive strength, flexibility to changes in wood species, versatility with respect to cure temperature and rate, excellent structural properties of the resulting composites and the ability to bond with lignocellulosic materials having higher water content than typically used for condensation resins such as phenol formaldehyde. In a typical process the organic polyisocyanate, optionally in the form of a solution, dispersion or aqueous emulsion, is applied to the lignocellulosic material which is then subjected to heat and pressure.

Preferred isocyanates are aromatic polyisocyanates of functionality two or higher such as pure diphenylmethane diisocyanate (MDI) or mixtures of methylene bridged polyphenyl polyisocyanates containing difunctional, trifunctional and higher functionality polyisocyanates. Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing difunctional, trifunctional and higher functionality polyisocyanates are referred to hereinafter as polymeric MDI.

Besides hot pressing and the amount and type of adhesive used, fiber quality (fiber size and morphology, surface characteristics, chemical properties, mechanical behavior) is the most important variable affecting the manufacturing process and panel properties.

The main feedstock for MDF manufacturing—thermomechanical pulp (TMP)—is usually obtained from a defibration process. After softening the wood matrix substance lignin in a digester, wood chips or sawmill residues (sawdust) are milled into fibers by the grinding discs of a refiner. Steaming temperature, respectively wood chip temperature after steaming, determines how the natural wood structure is processed into fibers. At temperatures below lignin softening, the fibers are pulled out of the wood structure and consequently damaged, while at temperatures above lignin softening, the wood substance is separated into single fibers at the middle lamella. Accordingly, the parameters of the defibration process determine the fiber quality achieved.

In any refining process a range of different qualities of fibers are generated, which can be categorized as fines, single fibers, small fiber bundles, truncated bundles, and large bundles. Refining conditions can try to maximize the fraction of any one of these types of groups, but it should be noted that even if the initial conditions are set for favouring one type of fiber over the others, due to wear of the refining blades the distribution of fiber qualities will change during the running of the process The selection of the refining parameters (e.g. the grinding plate distance, steaming temperature, residence time) is therefore very crucial and defines the concentration and dimensions/geometry of the fibers (single fibers/fiber bundles) as well the ratio between the different geometries.

It is known that the properties of a fiberboard are related to the quality (size and surface chemistry) of the wood fibers which it is made of Fibers with different size/geometry (single fibers and fiber bundles) behave differently towards water, resin and wax (liquid substances in general) hence affecting the final properties of a fiberboard differently.

There are many studies in literature in which the relationship between the refining parameters and the fiber size is measured and related to the properties of the fiberboard. Several sieve analysis and fiber characterization methods were developed.

Most of the prior art relates to production of boards using particles or fibers of a certain range of dimensions in order to achieve the desired performance in the final product. Chips and fiber dimensions are sometimes related to the moisture uptake of the final board. Usually preferred upper and lower limits of lengths or width of the particles/fibers are indicated in order to obtain good performance. In some cases it is assumed that particles and fibers of different size behave differently towards the resin and water.

Wenderel and Krug (Investigation of the influence of pulping parameters on morphological characteristics of TMP-pulp made from Scots pine, Eur. J. Wood Prod. (2012), 70:85-89) assumed that not fiber size is the cause for deteriorated panel properties at increased pulping pressure, but rather the interrelation between fiber and resin (fiber surface characteristic) is hampered.

In DE 102014119242 it is claimed that the length of single fibers and fiber bundles needs to be comprised between 2 and 15 mm and the cross section be less than 0.7 mm but preferably 0.5 mm. Furthermore it is said that thicker wood fibers or wood fiber bundles can be tolerated to a proportion of up to 15% of the weight of the dried fiber mat.

In WO 201345551 the performance of the board is alleged to be related to the fiber orientation in the board. Furthermore it is claimed that wood fibers with a length under 7 mm are necessary in order to obtain a sufficient fiber orientation in the final board.

EP 2347874 claims that in the production of particleboard due to the relationship of the volume to surface, small particles consume more adhesive than larger particles. The method proposed involves the application of the adhesive on different (previously separated) sized wooden particles adjusting the amount according to the size of the particles.

WO 200756839 refers to a manufacturing process for high performance lignocellulosic fiber composite materials. The key point is to generate wood fibers with an average length not below 0.2 mm. This allows to produce composite materials with a tensile strength above 55 MPa and flexural strength above 80 MPa.

In a journal paper published in 2016 (Investigation of the interrelations between defibration conditions, fiber size and medium-density fiberboard (MDF) properties) by J. T. Benthien, S. Heldner and M. Ohlmeyer of the Thunen Institute of Wood Research in Hamburg, Germany (Eur. J. Wood Prod., DOI 10.1007/s00107-016-1094-2) wood fibers were refined varying different refining parameters such as the time and temperature of steaming, the grinding discs distance and the wood species. The fibers obtained were analysed and used in a MDF board to correlate the fiber size to the performance. It was found that grinding disc distance and wood species are the most influential parameters on fiber length characteristics. Especially the content of undefibrated fiber bundles (shives) was found to strongly correlate with the grinding disc distance. Fiber size was found to be one of the parameters influencing panel properties. However, other fiber characteristics—in particular the chemical nature of the fiber, which is responsible for its wettability with water (thickness swell) and glue (mechanical properties)—have to be considered as important influencing parameters on panel properties.

Hence it is clear that variations in fiber quality have a considerable impact on the final board properties.

Methods to overcome the variation in fiber quality are not known. Selection of a specific fiber quality for a particular type of resin may well be possible but it does not address the problem of drifting quality of fibers whilst running the production.

Therefore it is an object of the present invention to overcome the problem of fiber variability in manufacturing fiberboards. In particular it is an object of the present invention to identify a class of resins, in particular methylene bridged polyphenyl polyisocyanates (pMDI), for use as binder in fiberboard, that is least sensitive to the range of qualities of fibers that are produced, thereby allowing for fiber variability and overcoming the spread of performance of the final board relating to fiber quality. As employed herein, the term "mechanical fastener" or variations thereof shall refer broadly to any suitable fastening, connecting or tightening mechanism including, but not limited to, screws, bolts, and the combination of bolts and nuts.

The present invention provides a process for binding lignocellulosic material comprising the steps of a) bringing lignocellulosic material into contact with a methylene bridged polyphenyl polyisocyanate composition and b) subsequently allowing said material to bind characterized in that said polyisocyanate composition has a surface tension below or equal to 46 mN/m, preferably below 40 mN/m and most preferably below 30 mN/m.

Also preferably the polar contribution of the surface tension of the polyisocyanate composition for use according to the invention is increased, generally from 0 to 6 or more mN/m.

Such polyisocyanate compositions will provide improved wettability towards a range of varying fiber quality. Hence there will be less influence of refiner conditions and changing (which happens naturally due to wear and tear, unsteady flow issues, etc.) refiner conditions during production and so quality of panels produced will be more steady during the course of a production shift. Between shifts refiner conditions can be reset.

Since industrially all the different fiber types are present simultaneously in different amounts depending on the refining conditions, the possibility to use a polyisocyanate resin that is wetting homogeneously all the fibers will be beneficial for the stability of the production and improves the board properties.

Surface tension is one of the parameters characterizing the surfaces of materials, in particular liquid. In case of solid surfaces the term surface free energy is normally used.

The surface free energy is the energy associated with the intermolecular forces at the interface between two media. Surface tension is the attractive force exerted upon the surface molecules of a liquid by the molecules beneath that tends to draw the surface molecules into the bulk of the liquid and makes the liquid assume the shape having the least surface area.

There are several approaches and different theories for the determination of the surface free energy mainly due to limits of applicability of examining methods. An exhaustive review with direct comparison of the most widely used methods and testing liquids was made by Hejda F., P. Solar, J. Kousal in Surface Free Energy Determination by Contact Angle Measurements—A comparison of Various Approaches, Part III, pages 25-30, 2010. The result of the calculation of the surface free energy depends on the liquids chosen for its determination hence it is fundamental to refer to the method used when giving such values. The two main approaches for determining surface free energy are: the equation of state and the acid/base method. (see Surface Free Energy Determination by Contact Angle Measurements—A Comparison of Various Approaches. F. Hejda, P. Solar, J. Kousal, 2010).

Figure 1:
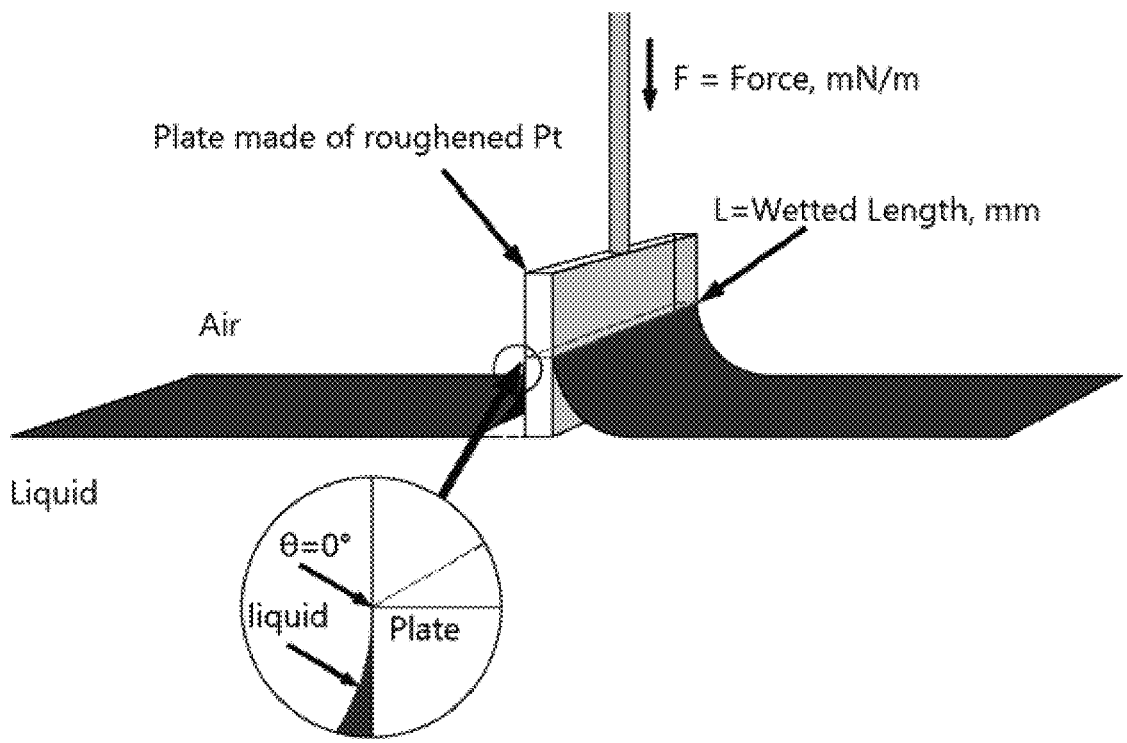
FIG. 1 is a schematic drawing of the Wilhelmy plate method used to measure the surface tension of a liquid.

The surface tension (SFT) of a liquid can be measured using the Wilhelmy plate method whereby the force acting on a vertically immersed plate is measured (Standard Test Method ASTM D1331-14) (see FIG. 1).

The Nouy ring method is an alternative to the Wilhelmy plate method and described as well in ASTM D1331-14. The two methods give similar results but Wilhelmy plate method is easier to be used.

These methods provide data that are useful in evaluating the effectiveness of surface active agents in reducing surface tension. In addition, surface tension data can predict interactions between liquids and solid surfaces or other liquids and can be used to establish wetting properties of paints, solvents, and other liquids. A number of laboratories have found the Wilhelmy plate to be easier to use and easier to clean. These test methods cover the determination of surface tension and interfacial tension of a variety of liquid materials, including but not restricted to paints, solvents, and solutions of surface-active agents, as defined in Terminology D459.

When a vertically suspended plate touches a liquid surface, then a force F, which correlates with the surface tension σ and with the contact angle θ according to the following equation, acts on this plate:

$$\sigma = \frac{F}{L \cdot \cos\theta}$$

The wetted length L of the plate is equal to its perimeter. To measure the force F, the plate is attached to a force sensor of a tensiometer.

To measure the surface tension platinum is chosen as the plate material as it is chemically inert and easy to clean, and because it can be optimally wetted on account of its very high surface free energy and therefore generally forms a contact angle θ0 of 0° (cos θ=1) with liquids. The required variable σ can be calculated directly from the measured force. The plate method is purely static. This makes it possible to record the change in SFT with respect to time as well as the end values at equilibrium.

Measurement of the dispersive and polar contribution of the surface tension is performed by the use of a PTFE (polytetrafluoroethylene) plate. PTFE is chosen as the plate material when measuring the dispersive contribution of SFT as its surface free energy is totally dispersive hence is considered a total non polar material that give optimally dispersive interaction. The polar contribution of the SFT is back calculated by the difference between the total surface tension and the dispersive contribution.

Surface tension of unmodified standard pMDI (e.g. Suprasec 5025) is 48 mN/m. The polar contribution of standard pMDI is 0 mN/m but increases up to 6 mN/m or even up to 10 or 20 mN/m in the polyisocyanate compositions used according to the present invention show beneficial results.

The surface tension can be decreased to the required levels with modification of the polymeric MDI composition.

Suitable modifications involve adding mono or dipolyol, branched polyol, amines, wetting agents and/or surfactants.

One way to decrease the surface tension of the polyisocyanate resin is to increase the hydrophilic content of the resin measured e.g. as the ethylene oxide content of the polyisocyanate composition. Preferably the ethylene oxide content of the monol or polyol used to modify the polyisocyanate composition is more than 20 wt %, preferably more than 50 wt %, most preferably more then 70 wt %. Increasing the hydrophilicity helps with reducing the variability of the wetting of the various fibers and improves the consistency of performance of the fiberboards.

This can be done by adding a polyethylenoxy compound to the MDI composition or by pre-reacting the p-MDI with a certain amount of such a compound.

Preferred compounds are monoalkyl ethers of polyethylene glycols such as those corresponding to the formula RO(CH$_2$CH$_2$O)$_n$H wherein R is methyl, n is an average of from 10 to 25. Typically said methoxypolyethylene glycols have a molecular weight of 300 to 1000. Such compounds and equivalent types and their reaction products with p-MDI are described in GB 1523601, GB 14449333 and GB 2018796. Preferably at least 10 parts by weight of said compound are added to the pMDI in order to decrease the surface tension to the desired level. Most preferably at least 20 pbw or even 30 pbw of said compound are added.

The process according to the present invention is especially suitable to manufacture fiberboard, in particular low density fiberboards (LDF), medium density fiberboards (MDF), high density fiberboards (HDF), and wood fiber insulation boards (WFI).

An important characteristic of wood fiberboard is the size of the wood fibers used. The fibers in fiberboard, such as MDF typically have a length of 7 mm or below, preferably of from 0.5 to 5 mm, a width/thickness of 0.005 to 0.2 mm. Also bundles of such fibers are generally present.

Such bundles may be due to entanglement of fibers or due to incomplete defibration of wood. Bundles sizes can be typically as large as several cm long (<2 cm) and usually less than 1 mm width/thick.

The wood fibers in MDF can originate from basically any fibrous lignocellulosic material, with typically used wood being beech, spruce, various types of pine, or eucalyptus.

In addition to selecting the particular polyisocyanate according to the invention the fibers can also be treated before (wood chips treatment), during and after refining to increase wettability of the wood fibers and to lessen the impact of the variability of the quality of the fibers.

The refiner condition can be changed for the removal of extractives by any means. Removal of the extractives on the surface of the fibers levels out the differences in dispersive/polar component of the surface free energy between various fibers geometries and thereby reduces the variability of wetting response and helps improve the adhesion with polyisocyanates and generally makes the adhesion better across the range of fiber qualities.

Both of these approaches (using a p-MDI with reduced surface tension and/or removal of extractives on the surface of the fibers) reduce the need for a targeted type of fiber which is in any case not possible to achieve other than during the refining process.

The polyisocyanate composition for use according to the present invention may be produced in accordance with any of the techniques known in the art.

The polyisocyanate binder composition may further contain any of the additives generally known in the art as long as the surface tension and its polar contribution of the binder composition remains within the claimed ranges. Conventional release agents such as, but not limited to, polysiloxanes, saturated or unsaturated fatty acids or fatty acid amides or fatty acid esters or polyolefin wax can be added to the polyisocyanate composition of the present invention.

The composition further may comprise conventional additives like flame retardants, lignocellulosic preserving agents, fungicides, bacteriocides, biocides, waxes, fillers, surfactants, thixotropic agents, curing aids, emulsifiers, wetting agents, coupling agents and other binders like formaldehyde condensate adhesive resins and lignins, neat or modified in some way such as formaldehyde polycondense, polypropoxylated or ethoxylated. The additives can be used in the amounts commonly known in the art.

The polyisocyanate composition of the present invention can be made by simply mixing the ingredients at room or elevated temperature or, when necessary, in case one of the ingredients is solid at room temperature, above the melting point of such an ingredient or by prior solubilisation in an appropriate solvent unless otherwise required as a suspension.

The present invention is primarily concerned with a process for preparing lignocellulosic bodies by bringing lignocellulosic parts into contact with the present polyisocyanate composition and by pressing this combination.

The lignocellulosic bodies are prepared by bringing the lignocellulosic parts into contact with the polyisocyanate composition like by means of mixing, spraying and/or spreading the composition with/onto the lignocellulosic parts and by pressing the lignocellulosic parts, preferably by hot-pressing, normally at 120° C. to 300° C., preferably 140° C. to 270° C. and 2 to 6 MPa specific pressure. Such binding processes are commonly known in the art.

While the process according to the present invention is particularly suitable for the manufacture of fiberboard (medium density fiberboard, high density fiberboard, wood fibers insulation board, wood plastic composite) and will be largely used for such manufacture, the process may not be regarded as limited in this respect and can also be used in the manufacture of oriented strand board, particle board (also known as chipboard) and plywood.

In wafer board manufacture the lignocellulosic material and the polyisocyanate composition may be conveniently mixed by spraying the present polyisocyanate composition on the lignocellulosic material while it is being agitated.

In medium density fiberboard the lignocellulosic material and the polyisocyanate composition may be conveniently mixed by spraying the present polyisocyanate composition on the lignocellulosic material in a blowline as commonly used.

Thus the lignocellulosic material used can include wood strands, woodchips, wood fibers, shavings, veneers, wood wool, cork, bark, sawdust and like waste products of the wood working industry as well as other materials having a lignocellulosic basis such as paper, bagasse, straw, flax, sisal, bamboo, coconut fibers, hemp, rushes, reeds, rice hulls, husks, grass, nutshells and the like. Additionally, there may be mixed with the lignocellulosic materials other particulate or fibrous materials such as grinded foam waste (for example, grinded polyurethane foam waste), mineral fillers, glass fiber, mica, rubber, textile waste such as plastic fibers and fabrics. These materials may be used in the form of granulates, shavings or chips, fibers, strands, spheres or powder.

Feedstock of wood fibers can be virgin wood, industrially waste wood and postconsumer waste wood. All combinations and mixtures can be used.

A single wood species is preferably used but it is common in industry to use mixtures of different wood species.

Non-wood fibers can also be used, mixed with wood fibers such as other lignocellulosic materials (e.g. bagasse, cotton, bamboo, etc.) or non lignocellulosic materials as synthetic textile and fibers. Such non-wood fibers are used preferably in a maximum amount, generally less than 30%, preferably less than 20% and most preferably less than 10% of the total material to be bonded.

Preferably though the main part of the lignocellulosic material (in general at least 80%) consists of wood fibers having the dimensions as specified above.

When the polyisocyanate composition is applied to the lignocellulosic material, the weight ratio of polyisocyanate/lignocellulosic material will vary depending on the bulk density of the lignocellulosic material employed. Therefore, the polyisocyanate compositions may be applied in such amounts to give a weight ratio of polyisocyanate/lignocellulosic material in the range of 0.1:99.9 to 20:80 and preferably in the range of 0.5:99.5 to 10:90 and most preferably in the range 3:97 to 8:92 or even 1.5:98.5 to 6:94.

If desired, other conventional binding agents, such as formaldehyde condensate adhesive resins, may be used in conjunction with the polyisocyanate composition.

More detailed descriptions of methods of manufacturing wafer board and medium density fiberboard and similar products based on lignocellulosic material are available in the prior art. The techniques and equipment conventionally used can be adapted for use with the polyisocyanate compositions of the present invention.

The process of making fiberboard, in particular MDF panels is generally known. The composition will generally be, in percentages by weight, 75-90% wood, 2-15% adhesive (glue), 0.5-2.5% additives, and 4-20% water.

Additives are optional. They are used in small amounts, and for different purposes. The most widely used additive is wax, preferably paraffin, which is added either as a wax melt or in the form of an aqueous emulsion. Paraffin, or other waxes, are mainly added to improve the swelling properties of the MDF. Other additives include colorants (e.g. to indicate different grades of MDF, or so as to fully colour the panel for decorative purposes). Other optional additives, depending e.g. on the geographical area and intended use, include fungicides or insecticides.

The panels can be generally made in a process comprising the following steps:
providing solid wood;
cutting the solid wood into wood chips (generally having a size of length and width 15 to 75 mm, and a thickness of 1.5 to 15 mm);
optionally, but preferably, purifying the chips by removing small contaminants, such as originating from stores or sand, and metals;
pre-steaming the chips (this involves a hydrothermal pre-treatment, by heating at 100° C. under atmospheric pressure);
refining, transforming the pre-treated wood chips to wood fibers having a length of 7 mm, or below, a width/thickness of 0.005 to 0.2 mm;
adding polyisocyanate adhesive and, preferably, wax;
drying;
causing the fibers onto a surface, so as to form a mat;
cord pre-pressing;
hot pressing;
finishing and cutting to size;
sanding.

In commercial, continuous processing, the surface on which the fibers are cast will generally be a moving belt, with also the further steps, including the pressing being conducted via a moving belt, e.g. via a double belt press or a calendar. It is conceivable, though, that the mat is provided on a continuously moving belt, and the pressing is conducted in a multiday light press.

The sheets and molded bodies produced according to the present invention have excellent mechanical properties and they may be used in any of the situations where such articles are customarily used.

The invention is illustrated but not limited by the following examples.

EXAMPLE 1: SURFACE TENSION OF POLYISOCYANATES

Four polyisocyanates were evaluated, polymeric MDI (Suprasec 5025), two emulsifiable MDIs, based on polymeric MDI with an increased amount of mono-functional polyol (methoxy polyethylene glycol of MW750) (MoPEG750), and a prepolymer of polymeric MDI and F442 (a polyether polyol having an ethylene oxide content of 73.5%, a functionality of 2.8 and molecular weight of 3500).

Figure 2:
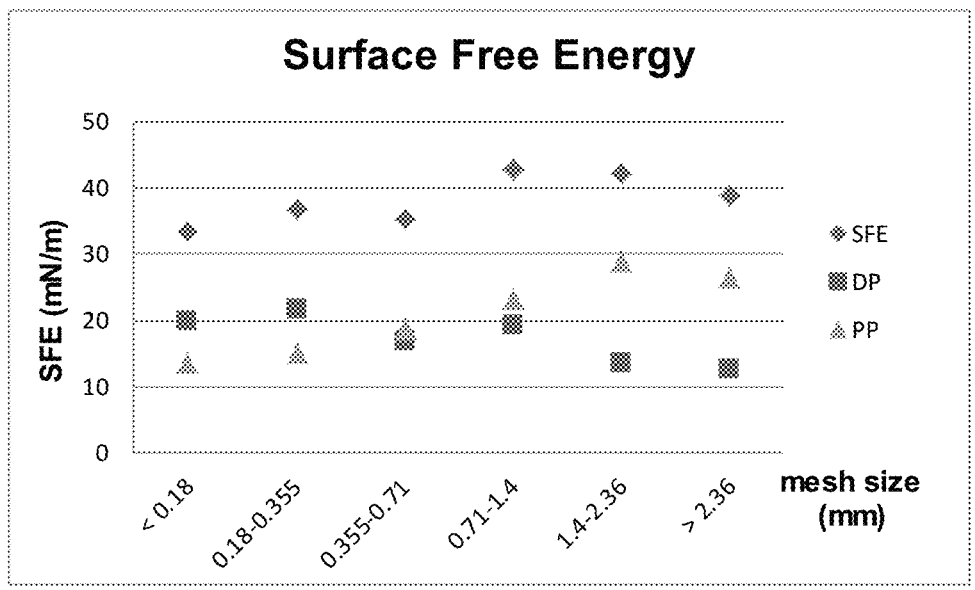
FIG. 2 is a graph depicting the surface free energy of wood fiber fractions.

As depicted in Table 1 below the surface tension of polymeric MDI is the result of only dispersive contributions and the addition of MoPEG750 generates a polar component that increases with its loading. The total surface tension is also decreasing slightly with the increase of the polyol concentration.

was calculated from measurements of contact angles towards water and DMSO. The results are depicted in FIG. 2.

TABLE 1

Measured values of surface tension and its dispersive and polar contribution for different isocyanates

| Isocyanate | Composition | Surface Tension (mN/m) | Dispersive Part (mN/m) | Polar part (mN/m) |
|---|---|---|---|---|
| Suprasec 5025 | Polymeric MDI | 48 | 48 | 0 |
| Suprasec 1042 | Polymeric MDI + 3% MoPEG750 | 47 | 46 | 1 |
| eMDI10 | Polymeric MDI + 10% MoPEG750 | 46 | 40 | 6 |
| Prepolymer | Polymeric MDI + 10% F442 | 44 | 38 | 6 |

EXAMPLE 2: WETTABILITY BETWEEN WOOD FIBERS AND POLYISOCYANATE

Wood fibers were obtained from the Wood Institute of Dresden where, with the use of a pilot scale blow line, fibers could be made in a controlled manner. The fibers were produced at 140 μm grinding plate distance, 3-4 minutes cooking time, 9 bar pressure (180° C.). Pine wood (Pinus Sylvestris) freshly cut (no more than one week before) was used.

The wood fibers were separated with the use of a Sieve Shaker, Analysette (Fritsh) provided with five sieves of different mesh size: 2.36, 1.4, 0.71, 0.355, 0.18 mm. The sieves were collocated on top of each other ordering them by the mesh size with the larger mesh size on the top. Approximately 1 g of wood fibers were dispersed manually on the top sieve and shaken for 5 minutes with an amplitude of 8 on 10 and permanent impulse. The fibers were collected on top of each sieve and the bottom cup yielding 6 fractions diversified by their size: >2.36 (large fiber bundles), 1.4-2.36 (medium fiber bundles), 0.71-1.4 (small fiber bundles), 0.355-0.071 (truncated fiber bundles), 0.18-0.355 (single fibers), <0.18 mm (fibres and fines).

Wood fibers were extracted in a 500 ml glass jar using subsequent extractions in 4 different solvents: dichloromethane, toluene/ethanol (2/1), ethanol and acetone. The jar was filled with 5 g of wood fibers and the selected solvent. After three days the solvent was removed by filtration, the fibers were left to dry for one night at room temperature and then the following solvent was added.

The fibers were conditioned before analysis in a Weiss Climate Chamber for at least 3 days at a temperature of 22° C. and a relative humidity of 55%, resulting in a theoretical moisture content of the fibers of 10-12%.

The contact angle of all the six fiber fractions towards water and dimethyl sulfoxide was measured. An average of at least 5 measurements was taken for each point.

The Washburn method was used to perform contact angle measurements via a Kruss 100 Tensiometer. Measuring the contact angle with two liquids of which the surface tension and its polar and dispersive components are known, and through the combination of the Young equation and the Owens and Wendt equation the total surface free energy of the solid can be derived.

Based on the Washburn method and according to Young-Owens-Wendt equations the surface free energy of the various wood fiber fractions and its polar and dispersive part The total free energy is slightly higher for fiber bundles than for single fibers. Single fibers are dominated by dispersive contribution while fiber bundles by their polar contribution.

Work of adhesion was used to evaluate the affinity between each wood fiber fraction and isocyanate resins. Higher the value, higher the affinity and hence the wetting.

Figure 3:
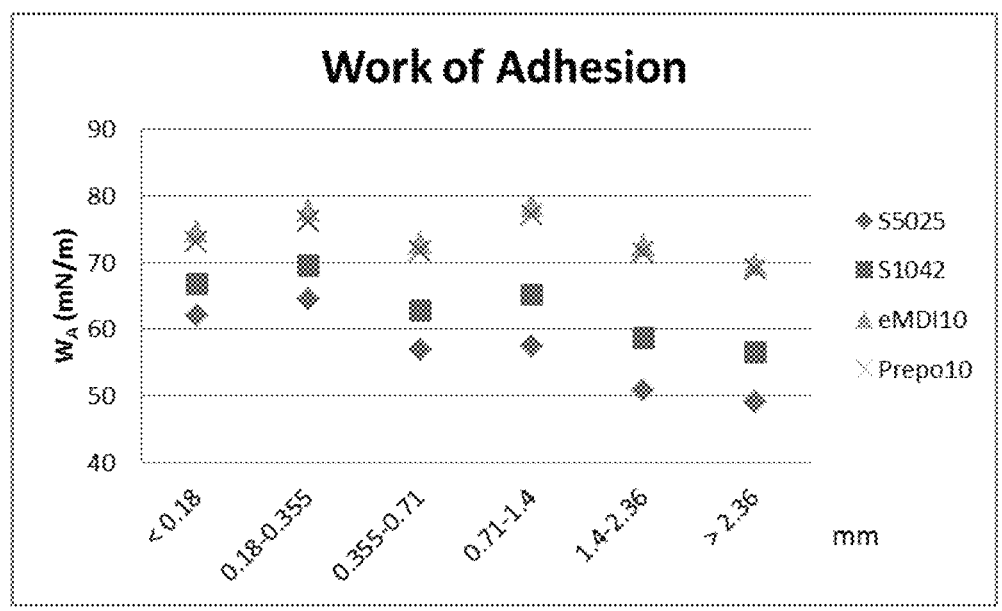
FIG. 3 is a graph depicting the work of adhesion between standard wood fiber fractions and different isocyanate.

The work of adhesion (WA) is the reversible work done in separation of unit area of solid to liquid interface. It can be used to evaluate the affinity between a solid and a liquid. The higher the value the higher the affinity hence the wetting. The general expression for WA can be complicated but Dupre and Fowkes have found an equation to be adequate at least for polymer-liquid systems ($Wa = 2(\gamma_{sd} \cdot \gamma_{ld})^{1/2} + 2(\gamma_{sp} \cdot \gamma_{lp})^{1/2}$). In this equation the dispersive and polar contributions of both solid and liquid are taken into account. WA is surely additive and it can be divided into contributions of different forces of adhesion. Knowing the solid surface free energy, dispersive and polar contributions, and measuring the liquid surface tension, dispersive and polar contributions, the WA can be determined The work of adhesion calculated for the various wood fiber fractions and the polyisocyanates of Table 1 is reported in FIG. 3.

Polymeric MDI (S5025) shows higher work of adhesion, hence affinity and wetting, with single fibers rather than fiber bundles. Its total dispersive character has higher affinity with single fibers because their surface energy is dominated by dispersive contributions. Fiber bundles are instead dominated by polar contributions hence the lower affinity with polymeric MDI.

With the increase of polarity of the isocyanate, the work of adhesion increases both for single fibers and fiber bundles although it increases more for fiber bundles that have a polar dominated character than the single fibers. This generates a leveling out of the differences in wetting between single fibers and fiber bundles with the use of a higher polar isocyanate as eMDI10.

This observation clearly shows that a polyisocyanate resin according to the invention having a reduced surface tension can accommodate the intrinsic difference in fiber types during industrial production. Since industrially all the different fiber types are present simultaneously, in different amount depending on the refining conditions, the possibility to use an isocyanate resin that wets all fibers similarly will be beneficial for the stability of the production and improves the board properties.

The invention claimed is:

1. A process for binding lignocellulosic material comprising:
   a) bringing the lignocellulosic material into contact with a methylene bridged polyphenyl polyisocyanate composition having a surface tension below or equal to 46 mN/m and wherein the polar contribution of the surface tension is at least 6 mN/m; and
   b) subsequently allowing said material to bind.

2. The process according to claim 1, wherein said polyisocyanate composition comprises methylene bridged polyphenyl polyisocyanate modified by adding monol or diols, branched polyols, amines, wetting agents and/or surfactants.

3. The process according to claim 1, wherein monoalkyl ethers of polyethylene glycols are added to the methylene bridged polyphenyl polyisocyanate in an amount of at least 10 pbw.

4. The process according to claim 1, wherein the lignocellulosic material is primarily wood based and fibrous in nature.

5. The process according to claim 4, wherein the wood fibers are single wood fibers and/or bundles of such fibers.

6. The process according to claim 5, wherein the fibers have lengths of 7 mm or below and width/thickness of 0.005 to 0.2 mm and the fiber bundles are less than 2 cm long and less than 1 mm wide/thick.

7. The process according to claim 1, wherein the polyisocyanate composition is applied in such an amount as to give a weight ratio of polyisocyanate to lignocellulosic material in the range 0.1:99.9 to 20:80.

8. The process according to claim 1, wherein step b) involves pressing the lignocellulosic material at 120° C. to 300° C. and 2 to 6 MPa specific pressure.

9. The process according to claim 1, wherein the surface tension is below 40 mN/m and the polar contribution of the surface tension is less than or equal to 10 mN/m.

10. The process according to claim 1, wherein the surface tension is below 30 mN/m and the polar contribution of the surface tension is less than or equal to 20 mN/m.

11. The process according to claim 1, wherein the polyisocyanate composition comprises methylene bridged polyphenyl polyisocyanate modified by pre-reacting the methylene bridged polyphenyl polyisocyanate with a monol or a polyol.

12. The process according to claim 11, wherein the monol or the polyol has an ethylene oxide content of more than about 20 wt. %.

13. The process according to claim 5, wherein the wood fibers have been pre-treated to remove extractives from the surfaces of the wood fibers.

14. The process according to claim 1, wherein the lignocellulosic material is brought into contact with the methylene bridged polyphenyl polyisocyanate composition by at least one of mixing, spraying or spreading the methylene bridged polyphenyl polyisocyanate composition with or onto the lignocellulosic material.

15. The process according to claim 1, wherein the lignocellulosic material has been premixed with at least one of grinded foam waste, a mineral filler, glass fibers, mica, rubber, plastic fibers or a fabric.

16. The process according to claim 1, wherein the methylene bridged polyphenyl polyisocyanate composition further comprises at least one of a wax, a colorant, a fungicide or an insecticide.

* * * * *